United States Patent [19]

Puschner

[11] 4,201,906
[45] May 6, 1980

[54] METHOD AND APPARATUS FOR ARC WELDING

[76] Inventor: Peter Puschner, Dreiänderweg 127. Vaalserquartier, Gut Fuchstal, 5100 Aachen, Fed. Rep. of Germany

[21] Appl. No.: 918,362

[22] Filed: Jun. 23, 1978

[30] Foreign Application Priority Data

Jun. 28, 1977 [DE] Fed. Rep. of Germany ....... 2728980

[51] Int. Cl.$^2$ .............................................. B23K 9/10
[52] U.S. Cl. ........................ 219/137 PS; 219/130.33
[58] Field of Search ................... 219/130.21, 130.33, 219/137 PS, 130.31, 130.32

[56] References Cited

U.S. PATENT DOCUMENTS

| 3,275,797 | 9/1966 | Manz | 219/130.21 |
| 3,423,564 | 1/1969 | Sevenco | 219/130.21 |
| 3,809,853 | 5/1974 | Manz | 219/130.21 |
| 3,904,846 | 9/1975 | Risberg | 219/137 PS |
| 3,928,746 | 12/1975 | Ericsson | 219/130.33 |
| 4,071,885 | 1/1978 | Bilczo et al. | 219/130.33 |

Primary Examiner—Bruce A. Reynolds
Assistant Examiner—Clifford C. Shaw
Attorney, Agent, or Firm—Kinzer, Plyer, Dorn & McEachran

[57] ABSTRACT

A method of and apparatus for arc welding, in which an energy source supplies the welding process and a simulated process in a bridge circuit the output of which, via an amplifier and a discriminator circuit controls the operation of the source in one of two or more modes having different characteristics such as constant voltage or constant power.

10 Claims, 7 Drawing Figures

METHOD AND APPARATUS FOR ARC WELDING

Prior Application: Priority, Federal Republic of Germany June 28, 1977, Application No. P 27 28 980.1.

The invention relates to a method of arc welding with a consumable electrode and to apparatus for carrying out the method.

In arc welding a process state is aimed at which guarantees a qualitatively assured result, namely the welding connection. Hitherto an attempt has been made to achieve this by operating the process with the most constant parameters possible. The welding parameters are regarded as constant, in this case, if the indicators of the measuring instruments (generally moving-coil measuring systems) indicating the operating quantities are largely static during the course of the process. In the case of arc welding with consumable electrodes, however, it is a question of an uncertain, variable process, the operating quantities of which change in considerably shorter times than can be detected by these measuring instruments. The rapid changes in the operating quantities are caused, for example, by the formation of molten metal drops, the separation of the metal drops from the welding electrode and movements of the molten bath. These phenomena are typical of the process for each type of electrode and make special demands on the operating means or welding energy source.

Attempts have therefore been made, by empirical means, to find a welding energy source for each arc-welding process which, as a result of its construction, at least in connection with the welding process, allows a high-quality joint result to be expected. Thus welding energy sources with a constant voltage characteristic are generally used today for the mechanized MIG, MAG and UP welding processes, and predominantly sources with a constant current characteristic for welding with rod electrodes by hand and the WIG process. These sources are not described, however, with regard to their dynamic behaviour in connection with the welding process. Satisfactory static and dynamic behaviour cannot be achieved without compromise as a result of the design of the sources.

It is therefore desirable to provide a method wherein the characteristic curve of the welding energy source is controlled via electrical characteristic quantities of the welding process depending on the instantaneous state of the process so that an optimum course of the welding results or, in other words, wherein the operating means or welding energy source in its capacity as the energy supplier, takes into consideration the instantaneous energy requirements of the welding process.

Such a requirement arises, for example, on the transfer of a molten metal drop from the consumable electrode to the molten bath, particularly in the case where a metallic, electrically conducting connection between electrode and molten bath is temporarily established through the metal drop (moment $t_o$ in FIG. 1). In this phase, which is always designated as the short-circuit phase in the technical literature, with the welding energy sources used today, the welding current increases, depending on the design of the source used, until the metallic connection is eliminated at the moment $t_1$. The arc is extinguished for the duration of the phase $(t_1 - t_o)$.

The current rise during the time from $t_o$ to $t_1$ is imposed by the not inevitable inductive components of the complex internal resistance of the welding energy sources used today. As soon as the metal drop has been absorbed by the molten bath, the metallic connection between electrode and molten bath is broken and the arc strikes afresh. Now the power developed in the present-day sources is considerably greater than it was before the metallic bridge formation. As a result, a very high temperature develops in the region of the arc. This leads to a high plasma pressure in the arc, which causes severe movements of the molten metal bath. At the same time, smaller drops of metal which are still on the electrode may spatter explosively as a result of the sudden rise in temperature.

These phenomena lead to a considerable disturbance in the course of the process and at the same time they delay a renewed stabilisation of the arc. Therefore highly qualified skilled labour is needed at present to adjust the welding parameters or to guide the rod electrodes. Nevertheless, the welding result is often unsatisfactory, however, because both the surface of the seam and the marginal regions of the molten bath are occupied by splashes and the weld bead is irregular in construction as a result of the violent, unequal movements of the bath.

When welding in an awkward position, that is to say in the vertical position or overhead, these disturbances have such an effect that the molten bath can no longer remain in the welding joint and the formation of drops or projections on the weld bead results.

It is an object of the present invention to obviate or mitigate these problems.

The present invention is a method of arc welding, in which a welding energy source, the characteristic curve of which can be switched over, is switched over, as required, by the welding process, from its programmed operational characteristic curve to at least one programmed requirement characteristic curve which is different from the operational characteristic curve for the duration of the requirement, the requirement of the welding process being defined by at least one electrical operating quantity of the welding process leaving a predetermined tolerance range.

The present invention is also arc welding apparatus comprising a welding energy source which is connectible to a single-phase or polyphase power supply and the characteristic curve of which can be controlled in the $\mu s$ to ms range, said source being connected to operate both the welding process and a simulated process in a bridge circuit with two measuring resistors, the state of the bridge being detected through a bridge measuring amplifier, and the output signal of the bridge measuring amplifier controlling a window discriminator through potentiometers, the position and the width of the window being adjustable by the potentiometers and the output signal of the window discriminator effecting the switching over of the characteristic curve of the source through its input.

Thus according to the invention, both the beginning and the duration of a change in the process are determined, for example, by the creation of a metallic connection between the electrode and the molten bath. Such a process state is called a "requirement" hereinafter.

During rod-electrode welding, for example, for the duration of this process requirement, the characteristic curve of the energy source is switched over so that when the arc is re-struck, the process is operated with only enough power so that no violent movements of the bath and metal drop explosions can result. When a quasi-steady state of the process is reached, which is characterised in that the arc between electrode and molten bath burns stably, the source is again switched over to the original characteristic curve.

The recognition of the disturbance of the process as a requirement effected according to the invention and the switching over from a so-called operational characteristic curve of the source to a so-called requirement characteristic curve lead to a settled and uniform welding process, while with all arc-welding processes, the positive characteristics in the interplay of the process with the source in the operational characteristic curve position are retained. With the mechanised welding processes MIG, MAG and UP, the process is retained with balance (so-called "internal regulation"); with the rod-electrode welding by hand, the possibility is retained of altering the power through the length of the arc by moving the rod electrode further away from or closer to the molten bath by the welder.

The instantaneous state of the welding process is determined by monitoring at least one electrical operating quantity of the welding process. This is effected, for example, by comparing the electrical operating quantities of the actual welding process with those of a simulated process which is operated from the same source, (see DE-OS No. 26 45 223).

The phase of the metallic connection between electrode and molten bath, for example, is expressed by a great reduction in the process impedance in comparison with the impedance of a simulated process, so that the alteration can be detected by electronic devices known per se.

Hereinafter, process impedance is understood to mean the electrical load impedance between contact tube and workpiece. Thus it is composed, for example, of individual impedances of the arc, of the free end of the wire and contact-making impedances. These are referred to accordingly in a representation of the U-I (voltage/current) diagram of process characteristic curves. Accordingly, there is a distinction between process impedance and arc impedance.

For the practical carrying out of the method, however, this is immaterial. As a rule, the process impedance is more easily accessible from the measuring point of view.

In contrast to the operation of the welding process with a fixed preset energy-source characteristic curve, therefore, according to the invention the process controls the power supply depending on its instantaneous electrical state.

Embodiments of the present invention will now be described, by way of example, with reference to the accompanying drawings, in which.

Figure 1:
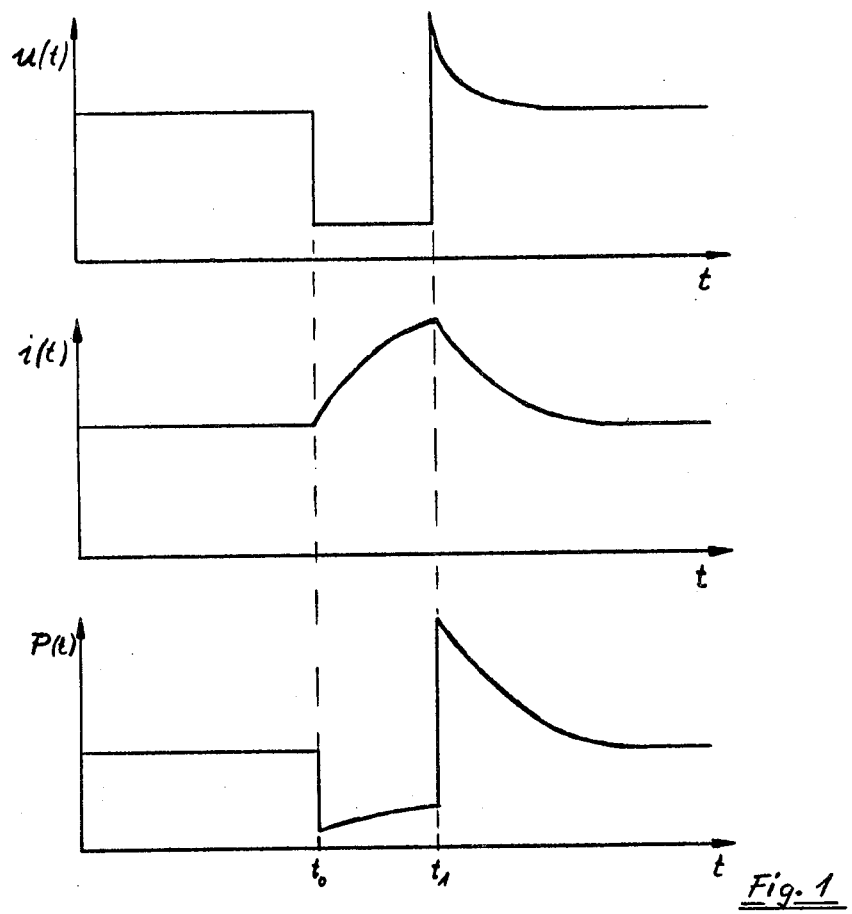
FIG. 1 illustrates the voltage, current and power variations as a metal drop transfers from an electrode to the molten bath.
Figure 2:
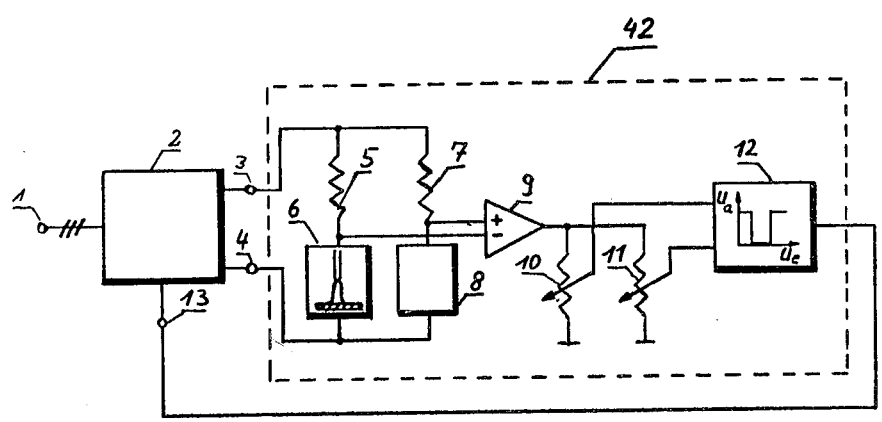
FIG. 2 is a block circuit diagram of welding control apparatus according to the present invention.

Referring now to FIG. 2, a welding energy source 1, the characteristic curve of which can be controlled, is connected to a single-phase or polyphase network 1. Through its output terminals 3 and 4, two series circuits, one consisting of a measuring shunt 5 and the welding process 6 and the other consisting of a measuring shunt 7 and a simulated process 8 are operated in parallel with each other, so that a bridge circuit results. The state of the bridge is continuously determined via the bridge measuring amplifier 9, which in turn controls a window discriminator 12 through two potentiometers 10 and 11. The width and the position of the window of the discriminator are defined by and can be adjusted by the potentiometers 10 and 11. The output of the window discriminator 12 actuates the switching over of the characteristic curve of the controllable welding energy source 2. If the operating quantities of the process correspond to those of the simulation, the output signal of the bridge measuring amplifier 9 is equal to zero. The output of the window discriminator 12 then delivers an output signal which switches on the so-called operational characteristic curve through the input 13 of the source 2.

If the electrode touches the molten bath or a metallic bridge is formed by the transferred metal drops, the impedance of the welding process 6 drops. Thus the bridge is unbalanced and a signal appears at the output of the bridge measuring amplifier 9, which signal causes the window discriminator 12 to deliver a non-zero signal at its output, which signal in turn switches over the welding energy source 2 to the so-called requirement characteristic curve through its input 13, until the electrical process operating quantities again correspond to those of the simulation. Only then does the signal of the bridge measuring amplifier 9 again become zero so that the source 2 is again switched over to the operational characteristic curve through the window discriminator 12. The window discriminator can also work with a switching hysteresis, depending on the application.

Figure 3:
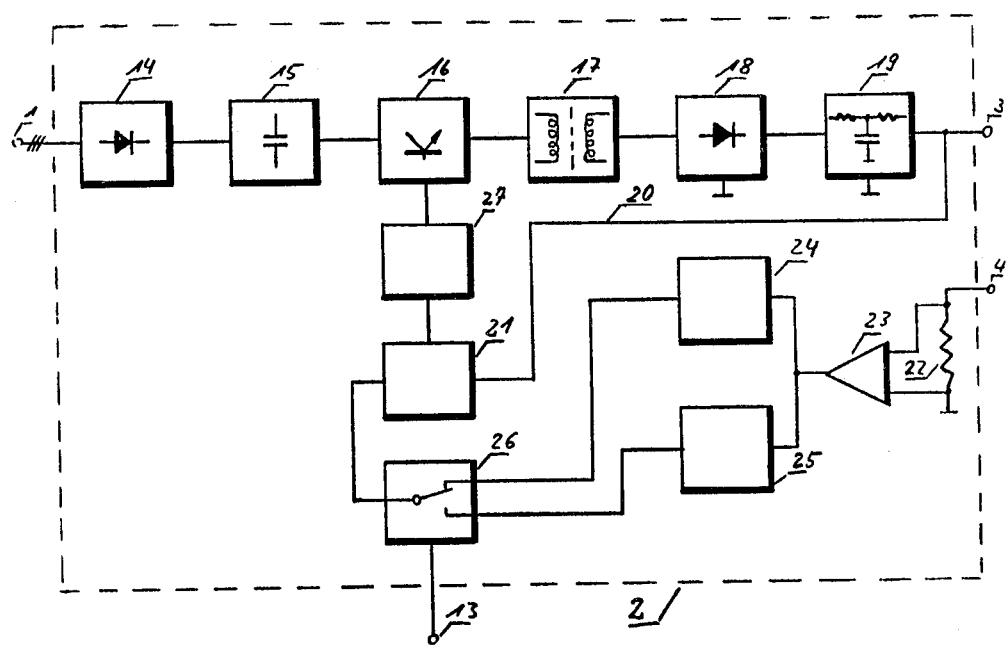
FIG. 3 is a circuit diagram of part of FIG. 2.

Any welding energy source, the characteristic curve of which can be controlled in the $\mu$s to ms range, can be used as a welding energy source 2. FIG. 3 shows a source, the characteristic curve of which can be controlled, on the switching amplifier principle, which is connected to the three-phase network of 380 V, 50 Hz. A capacitor bank 15 is charged through a 3-phase rectifier 14. There follows an electronic switch chopper 16 which can be controlled rapidly and which chops the direct voltage of the capacitor 15 and drives the primary winding of a transformer 17. This transformer is necessary for the electrical separation of the network 1 from the welding process. At the same time the maximum voltage necessary for the operation of the welding process is produced at the secondary winding of the transformer. The transformed alternating voltage is rectified by the rectifier 18. A low-pass filter 19 suppresses the ripple of the rectified output voltage of the rectifier 18. A voltage feedback 20 is connected to the actual-value input of an electronic regulator 21. The current taken from the source is supplied through a measuring shunt 22 to an amplifier 23 the output of which is connected to the inputs of two passive characteristic-determining networks 24 and 25. Networks 24 and 25 may constitute diode-resistor matrices; each is connected to an analogue switch 26. Through switch 26, the position of which is defined through the input 13, the output of the network 24 or the network 25 appears at the desired-value input of the regulator 21. The output of the regulator 21 controls a pulse-duration modulator 27 which controls the electronic switch 16. The electrical conditions resulting at the terminals 3 and 4, that is to say the characteristic curve of the welding energy source, are determined by the matrix of the particular network 24 or 25 presently connected to regulator 21 through switch 26. The construction and mode of operation of the switch 16, of the regulator 21, of the low-pass filter 19, of the diode-resistor matrices 24 and 25 and of the analogue switch 26 will not be described in more detail here because they are known circuits in electrical engineering. Energy sources working on this principle are sufficiently well known under the name "pulse-duration controlled networks" in the electrical engineering literature.

Figure 4:
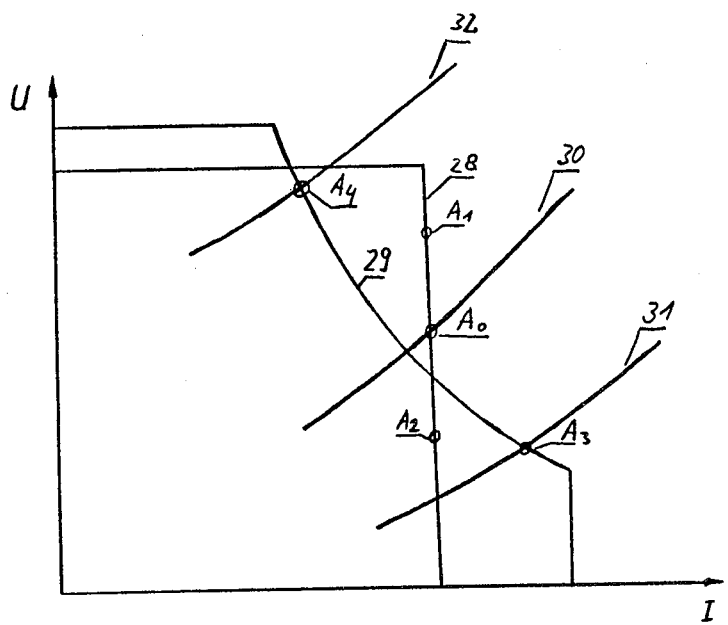
FIGS. 4 to 6 illustrate the characteristics of the embodiment of FIG. 2.

FIG. 4 shows an operational characteristic curve 28 and a requirement characteristic curve 29 which can be produced with this energy source 2. The characteristic curve of the welding process in the case of normal operation is represented by the curve 30. The point of intersection between the operational characteristic curve 28 and the characteristic curve 30 of the welding process provides the working point $A_o$. Now depending on the adjustment of the potentiometers 10 and 11, the welding process is enabled to assume any operational working points between the corner values $A_1$ and $A_2$. In this range, the welder can influence the energy supplied to the process by guiding the electrode during rod-electrode welding. If the electrode is brought closer to the workpiece, the electrical power supplied is less, if it is moved further away the electrical power supplied is greater. If the process impedance is greatly reduced, however, for example through the transfer of a metal drop, then the source is automatically switched over to the requirement characteristic curve 29 and the working point $A_3$ results for the duration of the process requirement.

If the arc length becomes too great, as represented by the process characteristic curve 32, and the process impedance and hence the power supplied becomes too high, the discriminator 12 likewise switches over to the requirement characteristic curve 29 or another, second requirement characteristic curve, not shown here, so that the lower-power working point $A_4$ results.

In the example shown in FIG. 4, a constant-current characteristic is selected for the operational characteristic curve in the working range, and a constant-power characteristic with voltage and current limitation is selected for the requirement characteristic curve. Any conceivable forms of characteristic curve may, however, be used and combined. For mechanised shielded arc welding or submerged arc welding, wherein the wire is supplied at a constant speed, a constant voltage characteristic is preferably selected for the operational characteristic curve and a constant-current or constant-power characteristic for the requirement characteristic curve. In each instance the operational characteristic should be distinctively different from the requirement characteristic, rather than merely differing in the amplitude of one parameter.

The response time of the controllable welding energy source with regard to the switching over of characteristic curves should lie in the ms range or below ($\mu$s range).

Figure 5:
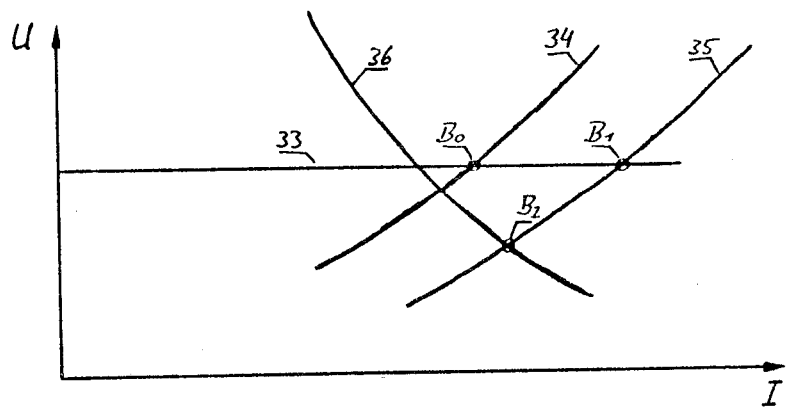

The use of the method during MIG welding will be explained with reference to another example. First it will be assumed that the operational characteristic curve 33 in the working range has a constant-voltage characteristic as shown in FIG. 5. Because of the predetermined wire feed speed, the working point $B_o$ becomes established. The electrical process characteristic curve has the course of the curve 34. If a metallic connection occurs between electrode and molten bath, then without switching over of the characteristic curve, the new process characteristic curve 35 and the working point $B_1$ result because of the low process impedance. The resulting power is so high, however, that the metallic connection would be explosively destroyed. This leads to unwanted spattering and an unsteady course of the process with strong movements of the bath.

With the method according to the invention, however, the changing process impedance is determined, for example through a bridge circuit with a simulation 8 and is used to switch over from the operational characteristic curve 33 to a so-called requirement characteristic curve 36 (here a constant-power characteristic curve for example).

Figure 6:
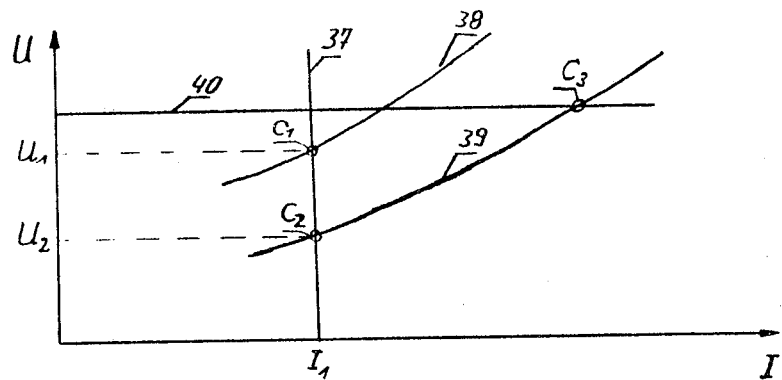

Finally, the use of the method according to the invention for pulse arc welding will show a last example. For this purpose a constant-power or constant-current characteristic curve 37 (FIG. 6) is selected as an operational characteristic curve. The theory and the scientific principles which have been worked out regarding the dynamic behaviour of the MIG welding process will not be discussed here and are assumed to be known. At any desired moment, the electrical process characteristic curve should have the course of the curve 38 so that the working point $C_1$ results as the point of intersection between the operational characteristic curve 37 and the process characteristic curve 38. The operational characteristic curve is selected so that the resulting power $U_1 \times I_1$ is not sufficient to melt the wire supplied at a constant speed. As a result, the arc length will become continuously shorter and after a short time (depending on the speed of the wire), the new process characteristic curve 39 with the working point $C_2$ will result. Here the operational characteristic curve 37 is automatically switched off and the requirement characteristic curve 40 is switched on. The actual switching over is effected in a few $\mu$s using modern analogue switches. Thus the working point $C_3$ results.

Figure 7:
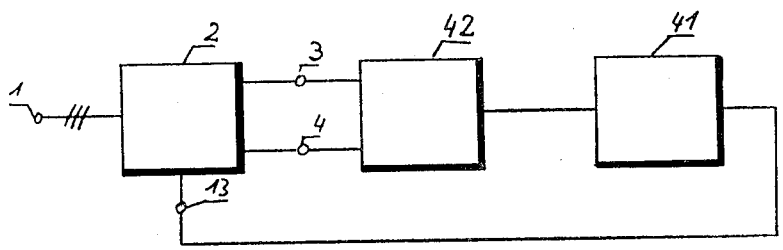
FIG. 7 illustrates a modification of the embodiment of FIGS. 2 and 3.

As a result of the high power supply, the drop is now formed and melted off. The duration for which the requirement characteristic curve 40 acts may appropriately be limited by a monostable multivibrator 41 (FIG. 7). Its pulse duration should be adjusted depending on the drop formation time (about 0.5 to 5 ms). In contrast to the known MIG pulse arc welding wherein the switching over of the characteristic curve is preset in its time sequence, here the process itself determines the moment of switching over the characteristic curve through its requirement. As a result, the wire speed can be varied without altering the adjustment of the source and be adapted to the particular welding task. The requirement of the process can be derived from the alteration of the voltage from $U_1$ to $U_2$ (FIG. 6) or by comparison of the process impedance with that of a simulation, for example in a bridge circuit.

The essential difference from the known arc welding process and the resulting progress is to be seen in that, in the method according to embodiments of the invention, process requirements which result from the dynamic behaviour of the welding process are recognised through appropriate devices and used for the automatic control of the welding energy source. The control of the welding energy source is carried out so that optimum allowance is made for the process requirement, regardless of the moment when it appears. As a result, an energy supply which is necessarily imposed by the characteristics of the energy source regardless of the instantaneous state of the process is avoided.

A number of advantages can be achieved by examples of the method and consist both of the principle of the method and in the apparatus embodying the method:

(1) The energy supply to the welding process is controlled through arc characteristic quantities depending on the instantaneous state of the process. During the phase of a metallic connection between electrode and molten bath, therefore, a maximum power to be transmitted to the process can be preset so that splashes and violent movements of the molten bath are avoided. In contrast to welding with a constant-power characteristic without switching over of characteristic curves, the welder retains the power control through control of the length of arc.

(2) Rod electrodes can be welded without effort even in awkward positions and even with frequent extinguishing of the arc.

(3) The process adjustment in MIG pulse arc welding is simplified considerably. The pulse frequency is adapted automatically to the preset wire speed.

(4) As a result of the process feedback with comparison with a simulation, any irregularities in the process are recognised immediately and the effects of the disturbances are weakened by adaptation of the power supply through the source.

(5) As a result of the use of a source, the characteristic curve of which can be controlled as shown in FIG. 3, mains disturbances and mains reactions are largely avoided as a result of the buffer introduced (capacitor 14).

(6) The welding energy source on the switch principle with pulse-duration modulation, represented for the carrying out of the method, works with high electrical efficiency (80 to 95%) and weighs between 10 and 20% of a conventional source. As a result, the source can be installed close to the process and long welding cables suffering from loss are avoided.

(7) The elements determining the characteristic curve and the deciding members necessary for the method (simulated process 8, bridge measuring amplifier 9, measuring resistors 5 and 7, discriminator 12) can be integrated in the welding energy source in the form of replaceable modules which are typical of the process.

I claim:

1. A method of arc welding, employing a programmed welding energy source actuatable, in a time interval of about one millisecond or less, between a first operating condition in which the energy source energizes a welding process in accordance with a predetermined operational characteristic and a second operating condition in which the energy source energizes the welding process in accordance with a predetermined requirement characteristic that is distinctively different from the operation characteristic, comprising the steps of:

A. continuously monitoring a given electrical parameter of the welding process and comparing that parameter with the corresponding electrical parameter of a simulated welding process energized from the same energy source;

B. actuating the welding energy source to its second operating condition whenever the comparison of step A indicates that the relation of the compared parameters has departed from a given tolerance range; and C. actuating the welding energy source back to its first operating condition when the comparison of step A indicates that the relation of the compared parameters has returned to the tolerance range.

2. The method of arc welding set forth in claim 1, in which the welding energy source is maintained in its second operating condition for a predetermined time interval, in step B, prior to initiation of step C and independently of a prior determination that the relation of the compared parameters has returned to the tolerance range.

3. The method of arc welding set forth in claim 2 in which the operational characteristic comprises a constant-current characteristic and the requirement characteristic comprises a constant-voltage characteristic,
 in which the parameters compared in step A are voltages,
 and in which step B is initiated in response to a drop below a minimum voltage.

4. The method of arc welding set forth in claim 2 in which the operational characteristic comprises a constant-current characteristic and the requirement characteristic comprises a constant-power characteristic,
 in which the parameters compared in step A are voltages,
 and in which step B is initiated in response to a drop below a minimum voltage.

5. The method of arc welding set forth in claim 1 in which the operational characteristic comprises a constant-voltage characteristic and the requirement characteristic comprises a constant-power characteristic, and in which the constant-power requirement characteristic corresponds substantially to the product of the current and the voltage at the working point of the constant-voltage operational characteristic.

6. The method of arc welding set forth in claim 1 in which the operational characteristic comprises a constant-current characteristic and the requirement characteristic comprises a constant-power characteristic, and in which the constant-power requirement characteristic corresponds substantially to the product of the current and the voltage at the working point of the constant-current operational characteristic.

7. Arc welding apparatus comprising:
 a welding energy source actuatable between a first operating condition having an output conforming to a predetermined operational characteristic and a second operating condition having an output conforming to a predetermined requirement characteristic that is distinctively different from the operational characteristic, actuation occurring in an actuation interval in the microsecond to millisecond range;
 bridge means, comprising two resistors, for connecting the welding energy source to a welding process and to a welding process simulation circuit, respectively, in a bridge circuit in which the welding process and welding process simulation circuit are located in adjacent legs of the bridge, the bridge being balanced for normal operation of the welding process;
 sensing amplifier means, connected to the bridge, for detecting an imbalance in the bridge representative of a requirement occurrence in operation of the welding process and generating an output signal indicative thereof;
 and actuating means, comprising a window discriminator responsive to the output signal of the sensing amplifier, and switching means actuated by the window discriminator, for actuating the welding energy source from its first operating condition to its second operating condition for a window interval when the amplitude of the output signal of the sensing amplifier exceeds a given tolerance range, the duration of each window interval effectively extending at least until the amplitude of the sensing amplifier output signal returns to the tolerance range.

8. Arc welding apparatus according to claim 7 in which the switching means comprises a monostable multivibrator which establishes a minimum duration for each window interval.

9. Arc welding apparatus according to claim 7 in which the welding energy source is energized from an A.C. supply and comprises:

the series-connected combination of a first rectifier, storage capacitor means, a semi-conductor chopper for chopping the voltage from the storage capacitor means to afford a pulse signal having a frequency of at least 1 KHz, a transformer, and a second rectifier, the second rectifier being connected to the bridge means;

and a feedback circuit, including a pulse-duration modulator, connected from the second rectifier to the chopper, for controlling operation of the chopper.

10. An arc welding apparatus according to claim 9 in which the feedback circuit includes a regulator interposed between the second rectifier and the modulator, and further comprising:

a measuring circuit, connected to the bridge means, for developing a measuring signal essentially representative of the welding process impedance;

and first and second passive networks, each connected to the measuring circuit, for generating first and second regulator control signals respectively corresponding to the energy source operational and requirement characteristics;

the switching means being connected to apply the regulator control signals to a desired-value input of the regulator.

* * * * *